(12) United States Patent
Newell

(10) Patent No.: US 8,611,004 B2
(45) Date of Patent: Dec. 17, 2013

(54) OPTICAL SYSTEM PROVIDING MAGNIFICATION

(75) Inventor: Michael P. Newell, Santa Rosa, CA (US)

(73) Assignee: Spaario Inc., Santa Rosa, CA (US)

( * ) Notice: Subject to any disclaimer, the term of this patent is extended or adjusted under 35 U.S.C. 154(b) by 171 days.

(21) Appl. No.: 13/158,193

(22) Filed: Jun. 10, 2011

(65) Prior Publication Data

US 2011/0304815 A1 Dec. 15, 2011

Related U.S. Application Data

(60) Provisional application No. 61/353,583, filed on Jun. 10, 2010.

(51) Int. Cl.
*G02B 23/00* (2006.01)

(52) U.S. Cl.
USPC .......................................................... 359/399

(58) Field of Classification Search
USPC .................................. 359/407, 399; 351/158
See application file for complete search history.

(56) References Cited

U.S. PATENT DOCUMENTS

| | | | | |
|---|---|---|---|---|
| 2,422,661 A | 6/1947 | Ellis | | 359/481 |
| 2,437,642 A | 3/1948 | Henrotreau | | 351/41 |
| 3,741,634 A | 6/1973 | Stoltze | | 351/57 |
| 4,429,959 A | 2/1984 | Walters | | 351/158 |
| 4,540,238 A | 9/1985 | Edwards | | 359/481 |
| 4,973,130 A | 11/1990 | Gernet | | 359/480 |
| 5,052,790 A | 10/1991 | Edwards et al. | | 359/399 |
| 5,076,682 A | 12/1991 | Pasfield | | 351/158 |
| 5,270,859 A | 12/1993 | Wirth et al. | | 359/622 |
| 5,363,240 A | 11/1994 | Miyashita | | 359/625 |
| 5,384,607 A | 1/1995 | Morris | | 351/158 |
| 5,485,305 A | 1/1996 | Johnson | | 359/407 |
| 6,002,517 A | 12/1999 | Elkind | | 359/409 |
| 6,018,422 A | 1/2000 | Feldman | | 359/619 |
| 6,226,120 B1 | 5/2001 | Feldman | | 359/399 |
| 6,686,582 B1 | 2/2004 | Volcker et al. | | 250/216 |
| 8,215,768 B2 * | 7/2012 | Oestereich et al. | | 351/158 |
| 2002/0008917 A1 | 1/2002 | Daniell | | 359/622 |
| 2003/0107806 A1 | 6/2003 | Jojiki et al. | | 359/481 |
| 2006/0103924 A1 | 5/2006 | Katz | | 359/399 |
| 2006/0171029 A1 | 8/2006 | Edwards | | 359/466 |
| 2006/0229720 A1 | 10/2006 | Glazier et al. | | 623/6.26 |
| 2007/0070507 A1 | 3/2007 | Yee et al. | | 359/622 |
| 2008/0094731 A1 | 4/2008 | Edwards | | 359/744 |
| 2009/0128899 A1 | 5/2009 | Newell | | 359/399 |

FOREIGN PATENT DOCUMENTS

EP 1027591 12/2003 ............. G01N 21/25

OTHER PUBLICATIONS

International Search Report for corresponding PCT application No. PCT/US2011/040058.

* cited by examiner

*Primary Examiner* — Hung Dang

(74) *Attorney, Agent, or Firm* — Matthew A. Pequignot; Pequignot + Myers LLC

(57) ABSTRACT

An optical magnifier has two light transmissive substrates with lenses on either side of each substrate and wherein the arrays of lenses are aligned such that an array of afocal optical magnifiers is produced. One of the arrays forming the array of afocal magnifiers has positive lenses and one of the arrays forming the array of afocal magnifiers has negative lenses. Two arrays of afocal magnifiers are combined to form a pair of magnifying glasses.

15 Claims, 12 Drawing Sheets

OPTICAL SYSTEM PROVIDING MAGNIFICATION

CROSS-REFERENCE TO RELATED APPLICATIONS

The present invention claims priority from U.S. Provisional Patent Application No. 61/353,583 filed Jun. 10, 2010, which is incorporated herein by reference.

BACKGROUND OF THE INVENTION

1. Field of the Invention

The present invention relates to an optical system for providing optical magnification.

2. Description of the Related Art and Background

From a historical perspective, conventional telescopes and binoculars are some of the earliest demonstrated forms of optical magnifiers. In general, these tend to be afocal magnifiers as they are viewed directly with the human eye. Binoculars include two telescope systems—one for each eye. In order to present an erect magnified image, binoculars employ telescope design forms such as the Galilean telescope as shown in FIG. 1, or an erecting telescope as shown in FIG. 2. The earliest telescopes and binoculars from the 17$^{th}$ century employed the Galilean form; with a positive power objective lens 11 and a negative power eyepiece lens 12 as shown in FIG. 1. The magnification of the telescope is calculated as the ratio of the focal lengths M=F/f, and the separation between the lenses is given by F-f. The advantage of this design form is its simplicity and that it provides an inherently erect and magnified image. Furthermore, it is lighter and more compact than an erecting telescope such as shown in FIG. 2. Disadvantages include a narrow field of view, an inability to achieve high magnifications, and that it is still relatively heavy and bulky. Generally, Galilean telescopes are limited to magnifications less than approximately 4×, and today are found in very limited applications such as "opera glasses", head-worn binocular vision aids for people with eye problems such as macular degeneration, and inexpensive binocular models.

The vast majority of binoculars manufactured and sold today employ an erecting telescope, such as shown in FIG. 2. FIG. 2 shows a telescope including a positive objective 21 and a positive power eyepiece lens 22. The purpose of the pair of Porro prisms 23 is to invert the image formed by the telescope. Without the Porro prisms, the magnified image would appear to be upside down to the person using the binoculars. Manufacturers also use roof prisms as an alternative to Porro prisms. The erecting telescope is capable of high magnifications and relatively wide fields of view, when compared with the Galilean telescope. They are, however, bulky and heavy, and for these reasons are not generally practical or used for head-mounted applications.

Observers of an event, in particular sports fans, concert-goers and opera-goers, often use binoculars to observe the event from a distance. Binoculars are typically operated with one or both hands. This is sometimes problematic, for example, during a sporting event, since a sports fan cannot simultaneously watch the game through binoculars and perform other activities that require the use of hands.

Until recently, various hands-free binoculars have been proposed, but they are often expensive and not optimally designed in form and function for the requirements of the sports fan, concert-goer or opera-goer in mind. For example, U.S. Pat. No. 2,422,661, issued Jun. 24, 1947 to C. A. Ellis, describes a binocular magnifying lens holder. U.S. Pat. No. 2,437,642, issued Mar. 9, 1948 to F. C. P. Henroteau, describes spectacles for vision correction. U.S. Pat. No. 3,741,634, issued Jun. 26, 1973 to Stoltze, describes binocular spectacles.

Further, U.S. Pat. No. 4,429,959, issued Feb. 7, 1984 to Walters, describes a spectacle mounted hinged monocular or binocular vision aid. U.S. Pat. No. 5,485,305, issued Jan. 16, 1996 to Johnson, describes a lightweight binocular telescope. U.S. Pat. No. 6,002,517, issued Dec. 14, 1999 to Elkind, describes flat, hands-free, convertible Keplerian binoculars.

Some of the most sophisticated head-worn binoculars available today are the head-worn binocular vision aids for people with eye problems such as macular degeneration. They are still relatively bulky which affects their wider acceptance for broader applications, and their weight is significant as well. The Eschenbach Model 1634 is an example of this type of binocular magnifier, with a magnification of 3×, a field of view of 9.5 degrees, and a weight of 70 grams. These binoculars are typically mounted in a pair of custom spectacle frames. Generally, the nearest optical surface to the eye for a pair of spectacles or head-mounted optics is approximately 15 mm in front of the eye. The telescopes then extend a further 20-25 mm from the eye in the case of the Eschenbach 1634 model as an example. This significant weight at a distance from the eye tends to exert a torque on the head and leads to neck strain when used for extended viewing periods.

In order to reduce the weight of the head-worn binoculars, one of the approaches employed has been to use all plastic optics rather than glass lenses as normal, and some models have used a Fresnel lens for the objective. This does serve to reduce the overall weight, but still has the same basic form as in FIG. 1 with a single positive objective lens and a single negative eye lens. So, the length of the telescope is still the same, making it rather bulky and unwieldy, and is a limitation of this design approach. Design models using this approach include the MAX TV and MAX Event models from Eschenbach.

Feldman disclosed a new form of optical magnifier in U.S. Pat. No. 6,226,120 that consists of a single array of Galilean telescopes for each eye mounted in a pair of spectacle frames. The form of the Galilean telescope employed by Feldman is shown in FIG. 3. This invention overcomes some of the limitations of a standard Galilean telescope, which is by nature heavy and bulky as discussed. The Feldman system by contrast is lightweight and compact, but has severe limitations due to the use of a single array of lenses; the optical performance of such a system is poor and may be unusable in many applications, suffering from large amounts of chromatic aberration, spherical aberration and off-axis aberrations such as coma and astigmatism. We know of no way to correct for these aberrations using a single array as disclosed by Feldman.

Wirth et al. in U.S. Pat. No. 5,270,859 discuss configurations of micro-optic multiplets (MOM) which include an array of Galilean telescopes as reproduced in FIG. 4. This design form suffers from an inability to simultaneously correct chromatic aberrations and aberrations arising from thermal expansion, which can result in poor imaging.

It is an object of this invention to provide an improved more compact optical design form allowing better correction of optical aberrations and consequently better image performance than offered in the aforementioned prior art devices.

It is a further object to provide an improved mounting method; and, an optical system having enhanced performance over a wide range of thermal environments.

The applications for this invention are many, including, but not limited to, a wide-angle attachment for camera systems, afocal magnifier for rifle scopes and night vision systems, telescope and binocular systems, and others as will be obvious to those skilled in the art.

SUMMARY OF THE INVENTION

In accordance with the invention there is provided, an optical magnifier comprising: a first light transmissive substrate having a first array of lenses of lenses on a first side thereof and a second array of lenses on a second side thereof, wherein the lenses have optical power and wherein the first array is optically aligned with the second array of lenses such that two opposing lenses on opposing sides of the first substrate have a common optical axis; and, a second light transmissive substrate having a first array of lenses on a first side thereof and a second array of lenses on a second side thereof, wherein the lenses have optical power and wherein the first array is optically aligned with the second array of lenses such that two opposing lenses on opposing sides of the second substrate have a common optical axis;

wherein the first substrate and second substrate are supported in a spaced apart position, and wherein the first and second optical substrates are optically aligned so that together they form an array of afocal optical magnifiers, wherein at least one array associated with the first light transmissive substrate or the second light transmissive substrate has positive lenses and at least one other array associated with the first light transmissive substrate or the second light transmissive substrate has negative lenses.

In accordance with further aspects of the invention the magnification of each afocal optical magnifier within the array is identical to within 1%.

Each lenslet in said first array of lenses on said first side of a first light transmissive substrate is plano convex; and wherein each lenslet in said second array of lenses on said second side of a second light transmissive substrate is plano concave.

Each lenslet in said first array of lenses on said first side of a first light transmissive substrate is made from an optically transparent material with low optical dispersion and an abbe number V greater than 50.

There is a gap between said second array of lenses on said second side of a first light transmissive substrate and said first array of lenses on said first side of a second light transmissive substrate; and wherein the gap is filled with an optically transparent medium.

The gap is less than the aperture of a single lenslet in the array or the array pitch.

The first light transmissive substrate and said second light transmissive substrate are made from the same material.

The first light transmissive substrate and said second light transmissive substrate are made from materials with similar thermal properties; and said materials shall have coefficients of thermal expansion that differ by no more than $3.0 \times 10^{-5}$ mm/mm/° C.

The optical magnifier comprises a collimating lens, said collimating lens being positioned between the object to be observed and the optical arrays, and wherein the object to be viewed is at or near the front focal plane of the collimating lens.

The collimating lens comprises a singlet lens with positive optical power.

The collimating lens comprises a Fresnel lens or a diffractive lens.

In another aspect a combination is provided comprising two optical magnifiers as recited above and an eyeglass frame, wherein both optical magnifiers are held by said eyeglass frame, and the optical magnifiers are positioned comfortably in front of the eyes.

In another aspect of the invention a combination is provided including a collimating lens, two optical magnifiers as recited above, and an eyeglass frame; wherein collimating lens is positioned between the object to be observed and the optical arrays and such that its optical axis passes through or near the midpoint between the observer's eye; and in an alternative embodiment only the sections of the collimating lens in front of each eye are used rather than the whole collimating lens.

Exemplary embodiments of the invention will now be described in conjunction with the drawings, in which.

Figure 6A:
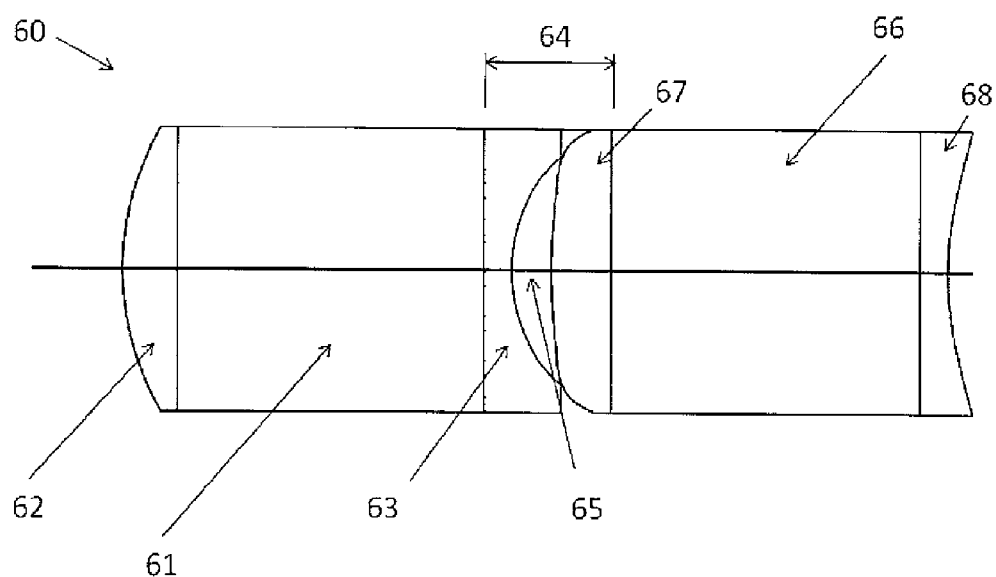
Figure 6B:
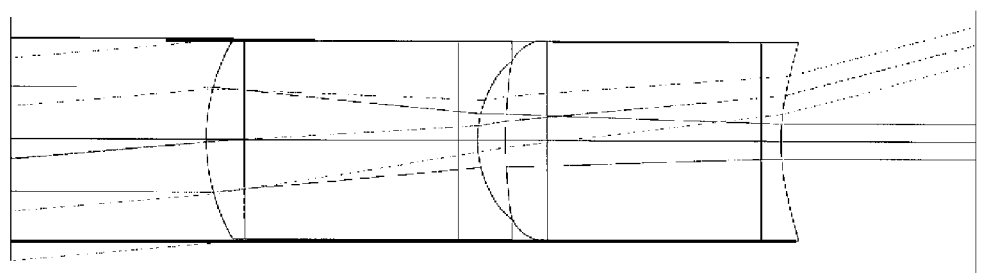
Figure 7A:
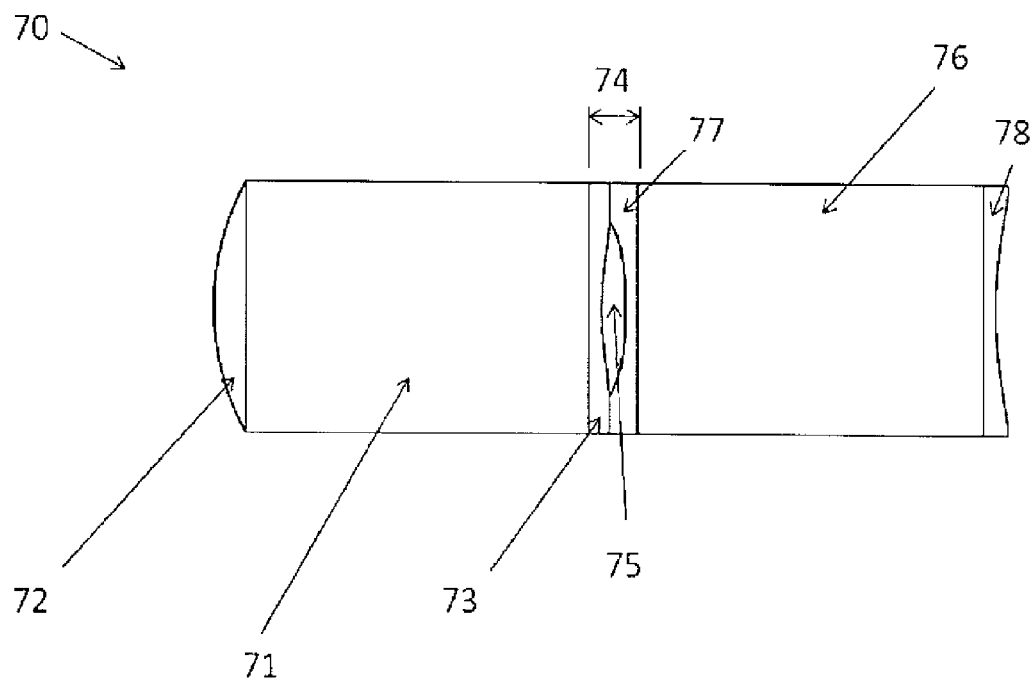
Figure 7B:
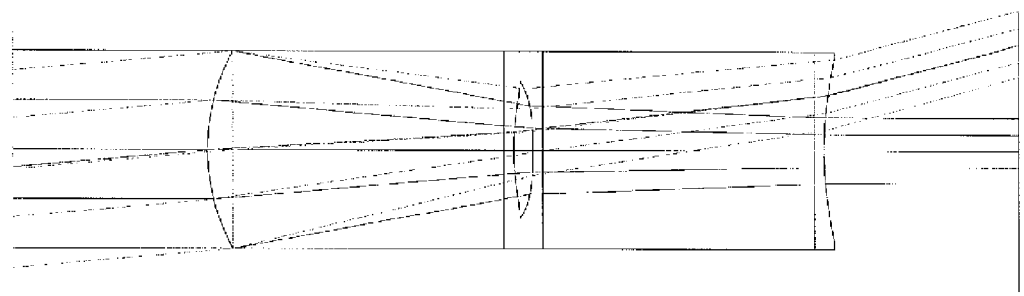
Figure 9:
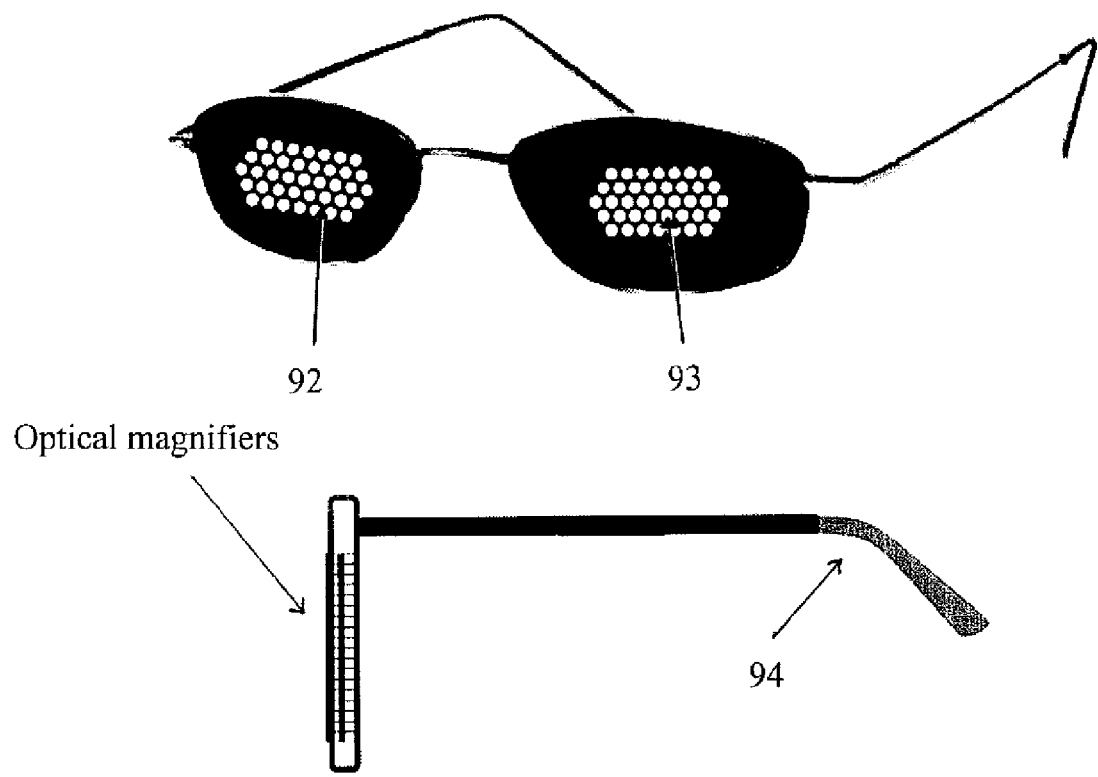
Figure 10:
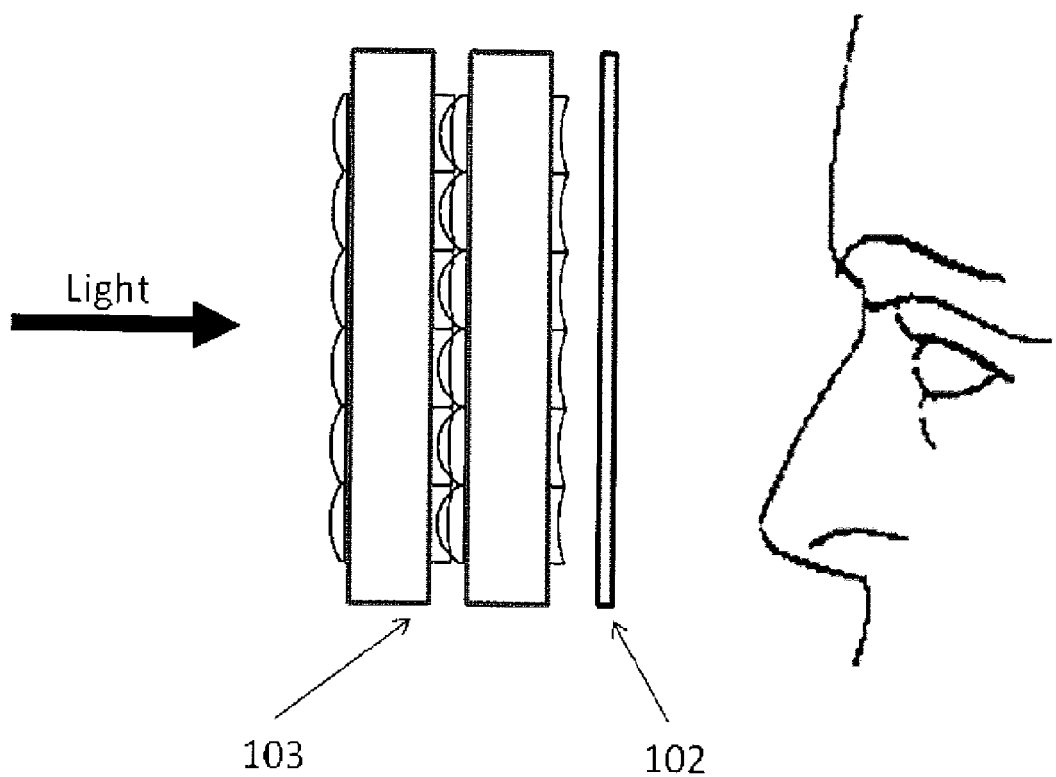
Figure 11A:
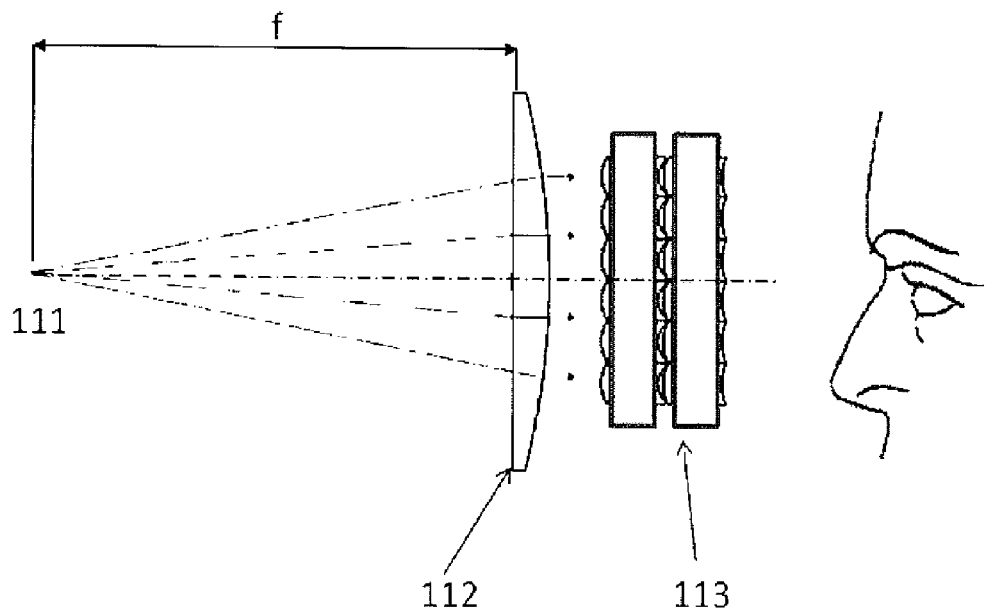
Figure 11B:
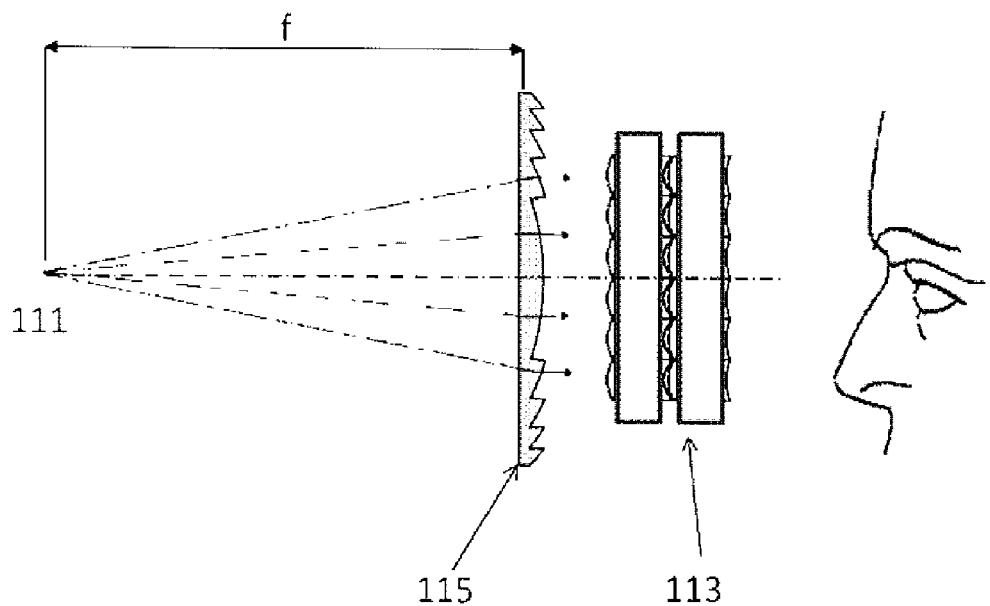
Figure 12A:
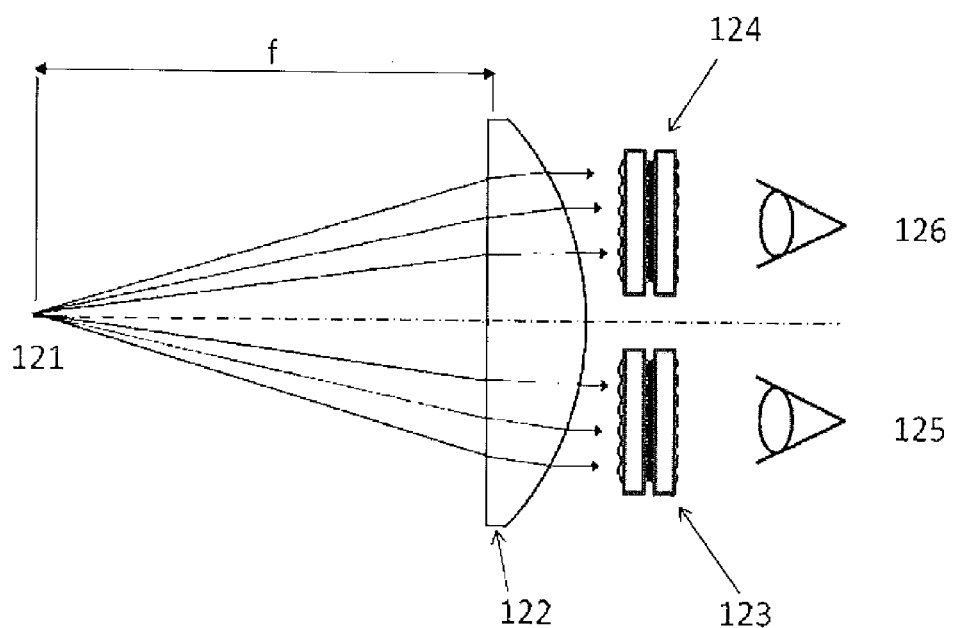
Figure 12B:
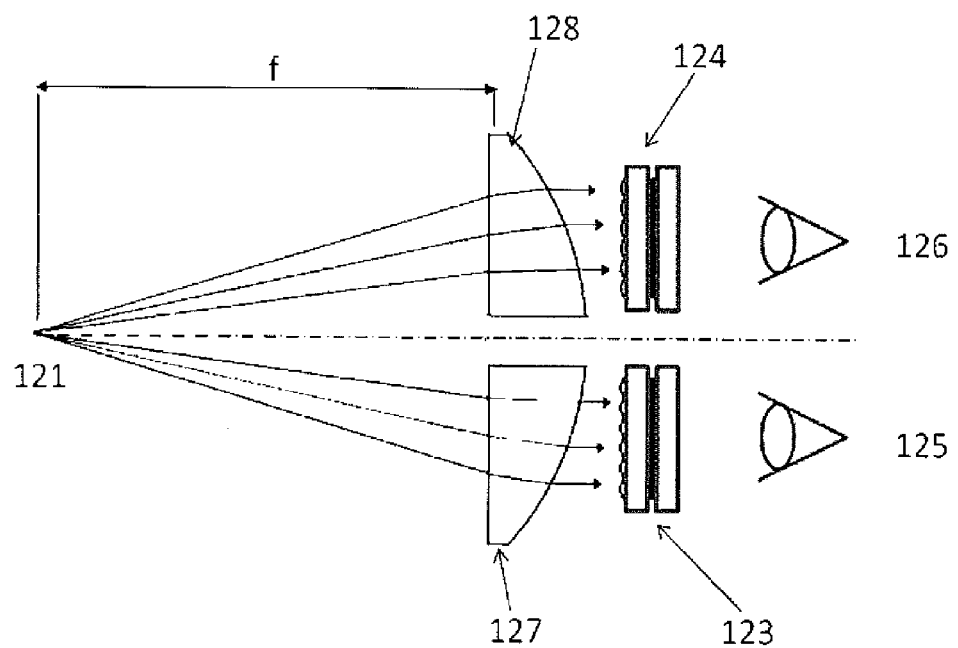
Figure 13A:
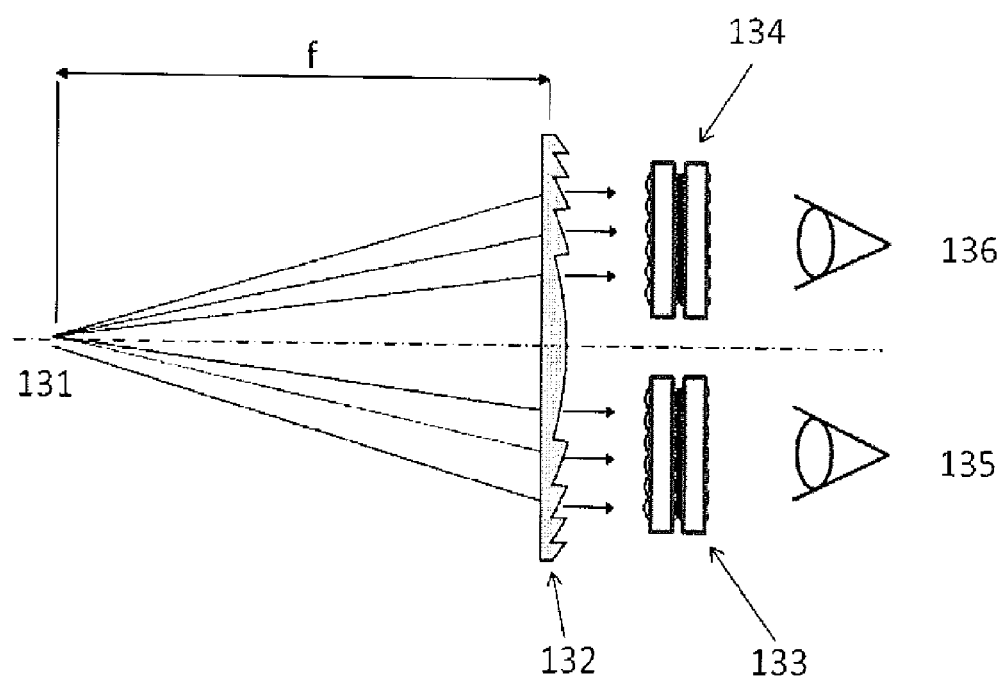
Figure 13B:
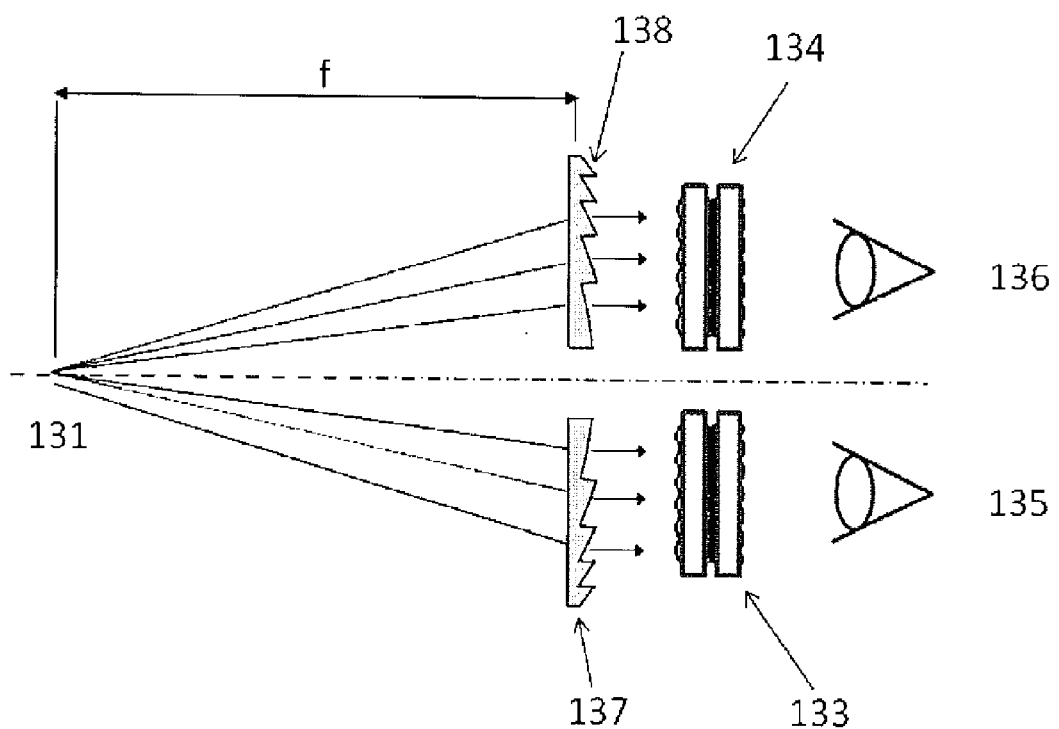

FIGS. 6(a) and 6(b) show a cross-sectional view of each individual afocal magnifier. (a) shows the critical components in each individual afocal magnifier. (b) shows an illustrative ray trace through the individual optical magnifier;

FIGS. 7(a) and 7(b) show a cross-sectional view of an alternate form for the individual afocal magnifiers. (a) shows the critical components in each individual afocal magnifier. (b) shows an illustrative ray trace through the individual optical magnifier;

FIGS. 8(a), (b), (c) and (d) illustrate different aperture shapes for the lens arrays. (a) illustrates circular aperture lenslets on a rectangular grid. (b) illustrates circular lenslet apertures on a hexagonal grid. (c) illustrates rectangular apertures on a rectangular grid. (d) illustrates hexagonal apertures on a hexagonal grid;

FIG. 9 illustrates an eyeglass frame with afocal magnifiers mounted for each eye;

FIG. 10 illustrates the use of a protective cover glass in conjunction with an afocal optical magnifier;

FIG. 11(a) illustrates an optical magnifier for use with objects close to the observer comprising a collimating lens used in conjunction with an afocal magnifier;

FIG. 11(b) illustrates an optical magnifier for use with objects close to the observer comprising a Fresnel lens as the collimating lens used in conjunction with an afocal magnifier;

FIG. 12(a) illustrates an optical magnifier for binocular use with objects close to the observer comprising a collimating lens used in conjunction with two afocal magnifiers;

FIG. 12(b) illustrates an optical magnifier for binocular use with objects close to the observer. The system comprises two off-axis sections of a single collimating lens and 2 afocal magnifiers;

FIG. 13(a) illustrates an optical magnifier for binocular use with objects close to the observer comprising a collimating Fresnel lens used in conjunction with two afocal magnifiers; and FIG. 13(b) illustrates an optical magnifier for binocular use with objects close to the observer. The system comprises two off-axis sections of a single collimating Fresnel lens and 2 afocal magnifiers.

DETAILED DESCRIPTION OF THE INVENTION

Figure 1:
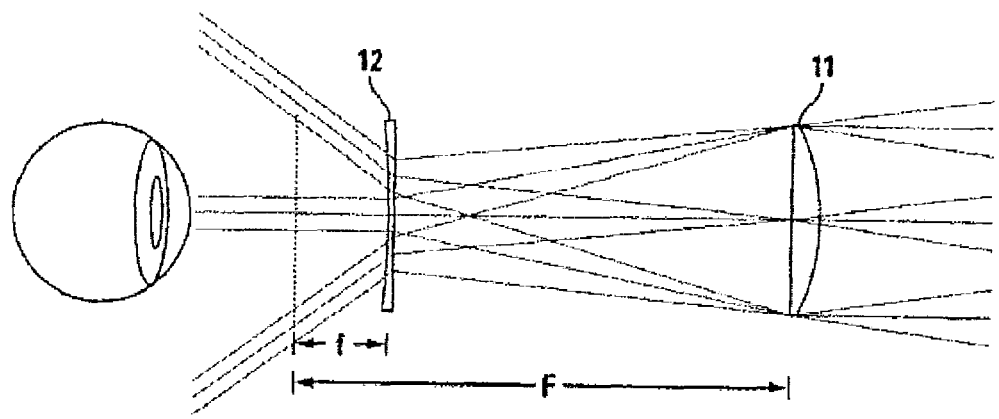
FIG. 1 is a prior art diagram showing a Galilean telescope.
Figure 2:
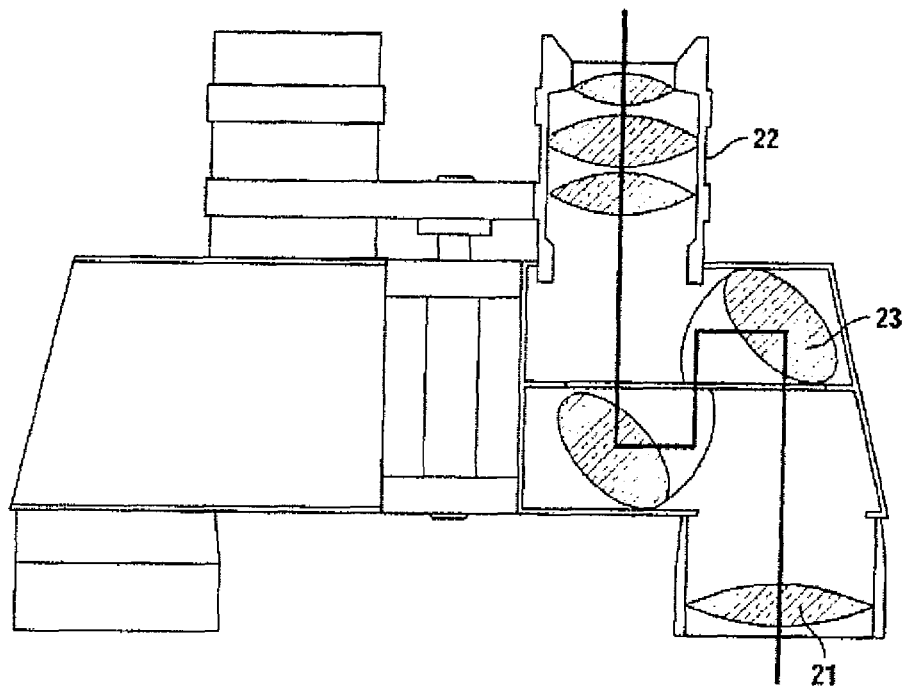
FIG. 2 is a prior art diagram showing binoculars incorporating an erecting telescope, where the inversion is performed by a pair of erecting prisms.
Figure 3:
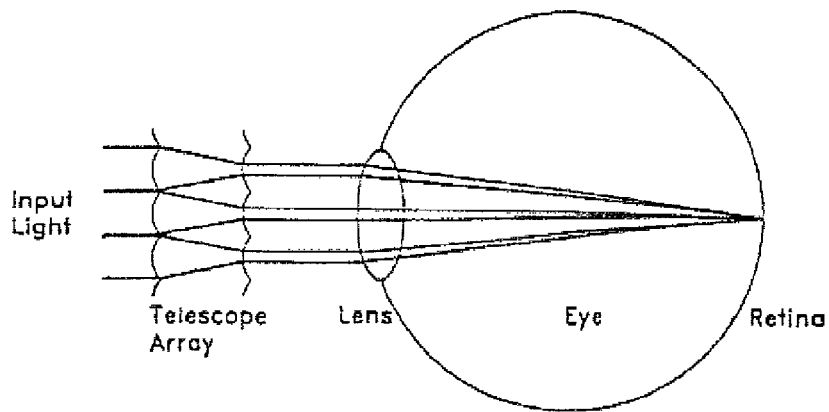
FIG. 3 is a prior art optical magnifier employing a single array of lenses.
Figure 4:
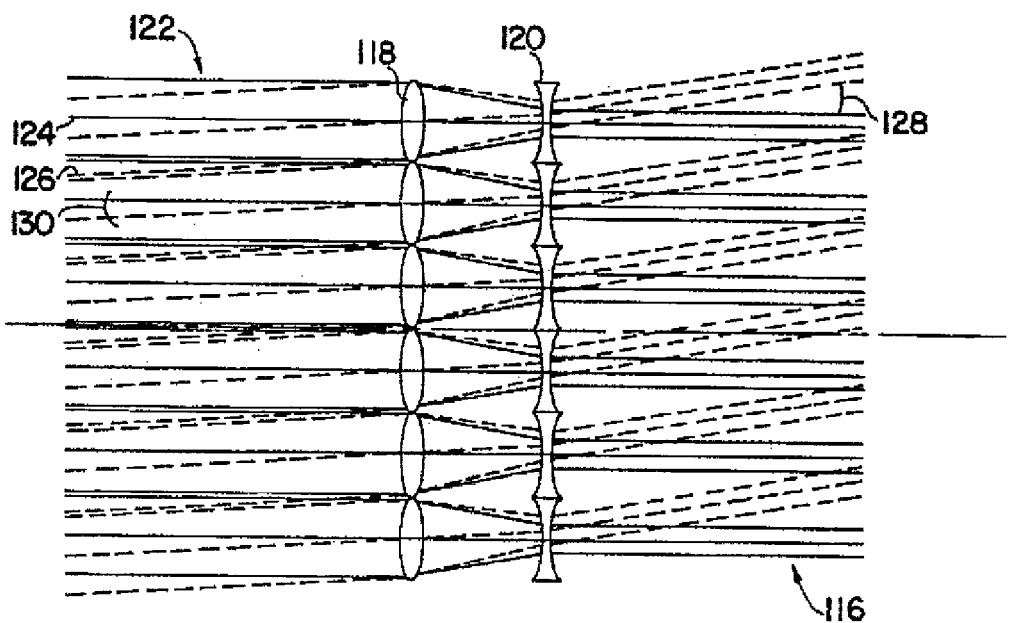
FIG. 4 is a prior art optical system employing 2 arrays of lenses.
Figure 5:
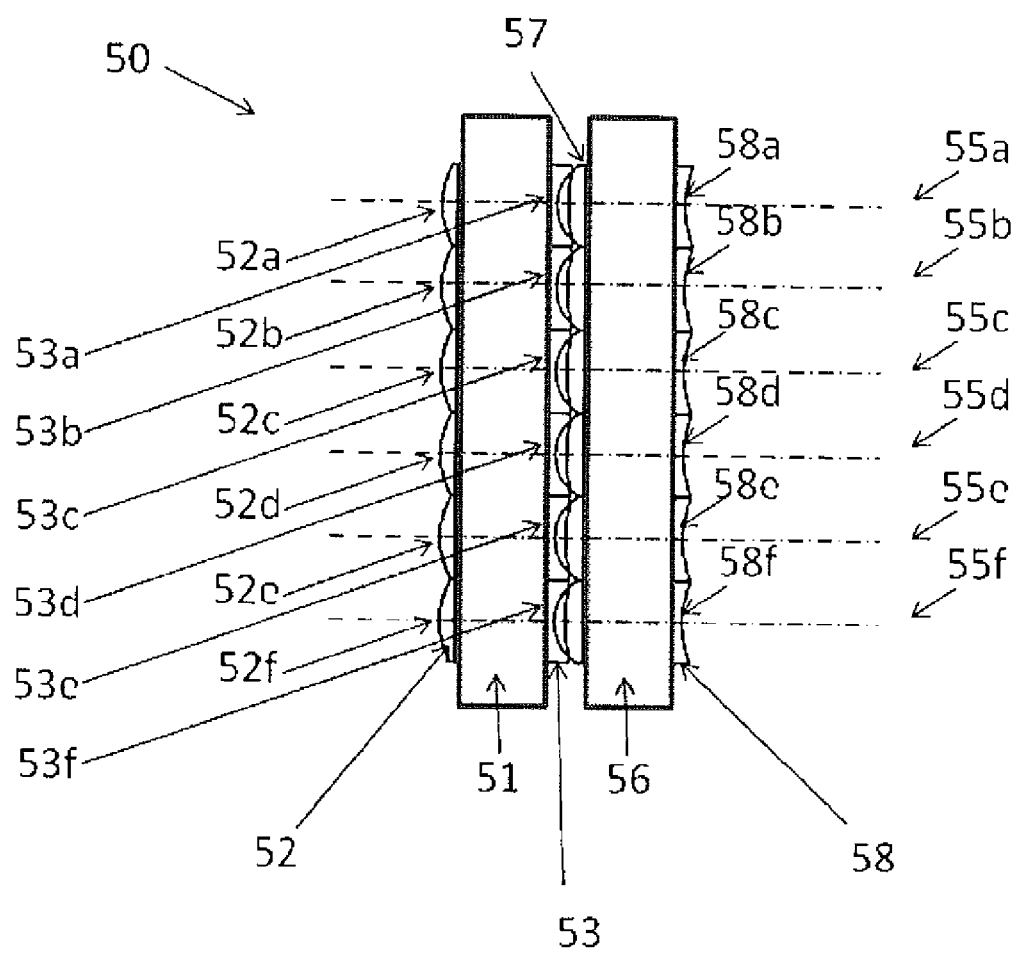
FIG. 5 is a cross-sectional diagram of an afocal magnifier system having two spaced substrates each having a front and back array of lenses. The diagram illustrates that the optical magnifier system comprises an array of individual afocal optical magnifiers.

Turning now to FIG. 5, an improved optical magnifier in accordance with this invention is formed by constructing an array 50 of afocal magnifiers, wherein each individual afocal magnifier is preferably identical. An enlarged version of the individual afocal magnifier 60 unit is shown in FIG. 6; and, an alternate design of an afocal magnifier 70 is shown in FIG. 7.

A preferred embodiment of this invention is shown in FIG. 5 wherein an optical magnifier includes two spaced-apart substrates 51 and 56. The first substrate 51 has a first array of lenses 52 attached to one side, and a second array of lenses 53 attached to a second side. Array 52 is formed of lenses 52a, 52b, 52c, 52d, 52e and 52f; and array 53 is formed of lenses 53a, 53b, 53c, 53d, 53e and 53f. The second substrate 56 has a first array of lenses 57 attached to one side, and a second array of lenses 58 attached to a second side. Array 57 is formed of lenses 57a, 57b, 57c, 57d, 57e and 57f; and array 58 is formed of lenses 58a, 58b, 58c, 58d, 58e and 58f. Furthermore, there is a gap between the first substrate 51 and the second substrate 56, and there is a gap between the lens array of the first substrate 53 and the lens array of the second substrate 57, as shown in FIG. 5.

It is highly preferred that the pitch of the arrays of lenses attached to each substrate be as identical as possible. Consequently, the optical axes 55a through 55f of all individual afocal magnifiers should preferably point in the same direction or be parallel to one another.

The first substrate 51 is made from an optically transparent material, such as glass, plastic or polymer. The second substrate 56 is also made from an optically transparent material, such as glass, plastic or polymer. The first and second substrates can be made from the same material or different materials. Glass, plastic or polymer are given as examples, but other optically transparent materials known to those skilled in the art can be used, particularly at different wavelength ranges outside the visible.

FIGS. 6a and 6b are enlarged views of the individual afocal magnifier unit 60. The first substrate 61 has a first lens 62 attached to one side, and a second lens 63 attached to a second side. The second substrate 66 has a first lens 67 attached to one side, and a second lens 68 attached to a second side. Furthermore, there is a gap 64 between the first substrate 61 and the second substrate 66, and there is a gap 65 between the lens array of the first substrate 63 and the lens array of the second substrate 67.

FIGS. 7a and 7b show an alternate design form of the individual afocal magnifier unit 70. The first substrate 71 has a first lens 72 attached to one side, and a second lens 73 attached to a second side. The second substrate 76 has a first lens 77 attached to one side, and a second lens 78 attached to a second side. Furthermore, there is a gap 74 between the first substrate 71 and the second substrate 76, and there is a gap 75 between the lens array of the first substrate 73 and the lens array of the second substrate 77. In this description, the statement the first substrate and second substrate are supported in a spaced apart position, means that the two substrates are not in the same position in space, but includes the possibility that they may be touching.

In a further embodiment of this invention, the gap between lenses, 65 in FIG. 6a and 75 in FIG. 7a, is filled with an optically transparent medium. The optically transparent medium may include glass, plastic, polymer, optical liquids, air, gases and other materials known to those skilled in the art. A preferred configuration has air filling the gap between lenses. A further preferred configuration has a gas such as dry nitrogen filling the gap in order to reduce the incidence of condensation or fogging on the surface of the lenses. The dry nitrogen or similar non-condensing gas is sealed in the gap under pressure. Dry nitrogen at two atmospheres of pressure works very well for this purpose.

The system is designed such that it relays light from an infinite or nearly infinite object conjugate to an infinite or nearly infinite image conjugate, with some angular magnification.

Each of the lenses attached to a substrate is made from an optically transparent medium, such as glass plastic or polymer. Each lens could be made from the same optical material, but improved optical performance will result from the use of a plurality of transparent optical materials. The selection of different materials with different optical properties, allows a designer the opportunity to correct chromatic aberrations. It is a preferred embodiment of the current invention wherein the lens arrays (52,53, 57, 58) are made from a plurality of different materials.

Each lens of an individual optical magnifier will have a surface with optical power and a plano surface which is in contact with the substrate, as shown in FIGS. 6 and 7. For each lens, the surface with optical power can be spherical in form, but most likely is aspheric in order to optimize the system performance. The use of aspheric lenses allows better correction of aberrations, particularly spherical aberration and off-axis aberrations like coma and astigmatism. It is also possible for each lens to include a diffractive surface, on the surface with optical power. It is a preferred embodiment of the current invention wherein one or more of the surfaces having optical power are spherical in form. It is a further preferred embodiment wherein one or more of the surfaces with optical power are aspheric in form. It is a further preferred embodiment wherein one or more of the surfaces with optical power include a diffractive surface.

The following table contains a prescription for the optical design form shown in FIGS. 6a and 6b. The optical magnifier has an angular magnification of M=3.0. As shown in Table 1, Lens 1 corresponds to 62 in FIG. 6a, Lens 2 corresponds to 63 in FIG. 6a, Lens 3 corresponds to 67 in FIG. 6a, and Lens 4 corresponds to 68 in FIG. 6a. Substrate 1 corresponds to 61 in FIG. 6a, and Substrate 2 corresponds to 66 in FIG. 6a. The airgap in Table 1 corresponds to 65 in FIG. 6a.

TABLE 1

|  | Lens 1 | Substrate 1 | Lens 2 | Airgap | Lens 3 | Substrate 2 | Lens 4 |
| --- | --- | --- | --- | --- | --- | --- | --- |
| Form | Plano-convex | Plano-Plano | Plano-concave |  | Plano-convex | Plano-Plano | Plano-concave |
| Material | Acrylic | D263T Float glass | Polystyrene |  | Norland 61 | D263T Float glass | Polystyrene |
| First Surface | Even polynomial asphere | Plano | Plano |  | Even polynomial asphere | Plano | Plano |
| Second Surface | Plano (flat) | Plano | Even polynomial asphere |  | Plano | Plano | Even polynomial asphere |
| Axial thickness (mm) | 0.197 | 1.1 | 0.100 | 0.143 | 0.216 | 1.1 | 0.100 |
| Lens Diameter (mm) | 1.00 |  | 1.00 |  | 1.00 |  | 1.00 |

An even polynomial asphere surface is defined as follows:

$$z = \frac{cr^2}{1 + \sqrt{1 - (1+k)c^2 r^2}} + \alpha_1 r^2 + \alpha_2 r^4 + \alpha_3 r^6 + \alpha_4 r^8$$

Where z=axial coordinate (i.e. surface sag)
r=radial coordinate in lens units
k=conic constant
c=surface curvature (reciprocal of surface radius)
$\alpha_i$=aspheric coefficients Lenses 1 through 4 in table 1 above each have even polynomial asphere surfaces, and the coefficients are defined in table 2 below.

TABLE 2

| Lens | k | c | $a_1$ | $a_2$ | $a_3$ | $a_4$ |
|---|---|---|---|---|---|---|
| 1 | 0 | 0 | 0.545418 | 0.114023 | 0.026202 | 0.136542 |
| 2 | 0 | 0 | 0.889048 | 0.367711 | −7.774645 | 76.697760 |
| 3 | 0 | 0 | 0.326801 | −0.450497 | −9.152143 | 63.414802 |
| 4 | 0 | 0 | 0.479430 | −0.671212 | 1.029463 | −0.946472 |

The gap or space between substrate 1 and substrate 2 is 0.459 mm.

The following table contains a prescription for the optical design form shown in FIGS. 7a and 7b. The optical magnifier has an angular magnification of M=3.0. As shown in Table 3, Lens 1 corresponds to 72 in FIG. 7a, Lens 2 corresponds to 73 in FIG. 7a, Lens 3 corresponds to 77 in FIG. 7a, and Lens 4 corresponds to 78 in FIG. 7a. Substrate 1 corresponds to 71 in FIG. 7a, and Substrate 2 corresponds to 76 in FIG. 7a. The airgap in Table 3 corresponds to 75 in FIG. 7a.

TABLE 3

|  | Lens 1 | Substrate 1 | Lens 2 | Airgap | Lens 3 | Substrate 2 | Lens 4 |
|---|---|---|---|---|---|---|---|
| Form | Plano-convex | Plano-Plano | Plano-concave |  | Plano-concave | Plano-Plano | Plano-concave |
| Material | PMMA | BF33 Float glass | Polycarbonate |  | Polycarbonate | BF33 Float glass | Polycarbonate |
| First Surface | Even polynomial asphere | Plano | Plano |  | Even polynomial asphere | Plano | Plano |
| Second Surface | Plano (flat) | Plano | Even polynomial asphere |  | Plano | Plano | Even polynomial asphere |
| Axial thickness (mm) | 0.066 | 0.7 | 0.025 | 0.05 | 0.025 | 0.7 | 0.025 |
| Lens Diameter (mm) | 0.50 |  | 0.50 |  | 0.50 |  | 0.50 |

Lenses 1 through 4 in Table 3 above each have even polynomial asphere surfaces, and the coefficients are defined in table 4 below.

TABLE 4

| Lens | k | c | $a_1$ | $a_2$ | $a_3$ | $a_4$ |
|---|---|---|---|---|---|---|
| 1 | 0 | 0 | 0.992481 | 0.787243 | 1.364430 | 12.963980 |
| 2 | 0 | 0 | 0.860869 | −7.341813 | −17.895886 | −4089.8423 |
| 3 | 0 | 0 | −0.499605 | −13.118787 | −214.21539 | −761.56289 |
| 4 | 0 | 0 | 0.597567 | −2.635535 | 12.238133 | −23.358211 |

The gap or space between substrate 1 and substrate 2 is 0.100 mm.

Review of FIGS. 6b and 7b and the included raytraces reveals that the majority of the positive power in the optical system is provided by Lens 1 (62 in FIG. 6a and 72 in FIG. 7a). This is needed in order for the system to be very compact, i.e. to minimize the system's axial length. So, in most cases, Lens 1 has a plano-convex shape. In a preferred embodiment of this invention, the array of lenses attached to substrate 1 and shown as 52 in FIG. 5 are plano-convex in form. The individual lenses are also shown as plano-convex 62 in FIG. 6b and 72 in FIG. 7b. In this preferred configuration, the outer surface of each of the lenses in the array furthest from the eye or receiver has a convex shape. Furthermore, in order to correct chromatic aberrations, it is desirable to make Lens 1 from an optically transparent material with low dispersion (i.e. high abbe number). In a preferred embodiment of this invention, the array of lenses 52 attached to substrate 1 in FIG. 5, and shown in greater detail as 62 (Lens 1) in FIG. 6a and 72 (Lens 1) in FIG. 7b, is made from an optically transparent material with an abbe number V greater than 50.

In a further preferred embodiment, the array of lenses 52 attached to the first side of substrate 1 51, and shown in greater detail as 62 (Lens 1) in FIG. 6a and 72 (Lens 1) in FIG. 7b, is made from a different material from that of the substrate 51 to which it is attached.

In order to achieve the most compact configuration, when the majority of positive optical power is provided by Lens 1, the most desirable form of Lens 2 is plano-concave which gives the lens negative power. In a preferred embodiment of this invention, Lens 2 has a plano-concave shape, i.e. the array of lenses 53 attached to the second side of a first substrate 51 are plano-concave in form. Correspondingly, 63 (Lens 2) in FIG. 6a and 73 (Lens 2) in FIG. 7b are plano-concave in form.

Furthermore, when Lens 2 has a plano-concave form, and therefore has negative power, it is desirable to make this lens from an optically transparent material with high dispersion, i.e. low Abbe number. This results in better correction of chromatic aberrations for the optical system. The material used for Lens 2 as shown in FIGS. 6 and 7 and detailed in tables 1 through 4, is polystyrene, but can be any optically transparent material with an abbe number V<40. In a preferred embodiment of this invention, the array of lenses 53 attached to the second side of a first substrate 51 is made from an optically transparent material with an abbe number V less than 40.

In a further preferred embodiment, the array of lenses 53 attached to the second side of a first substrate 51 is made from a different material from that of the substrate 51 to which is attached.

Lens 3 can be either plano-convex or plano-concave in form, as shown in FIG. 6a as 63 and in FIG. 7a as 73. Consequently, it can have either positive or negative power.

Further review of FIGS. 6 and 7, and the included raytraces, show that Lens 4 is plano-concave in shape. Consequently, Lens 4 has negative power. In a preferred embodiment of this invention, Lens 4 has a plano-concave shape, i.e. the array of lenses 58 attached to the second side of a second substrate 56 are plano-concave in form. The plano-concave form of Lens 4 is shown in greater detail in FIG. 6a as 68 and in FIG. 7b as 78.

The combination of these features represent a significant improvement over the prior art disclosed by Wirth et al. in U.S. Pat. No. 5,270,859, which discloses a single array of bi-convex lenses providing the positive optical power for the system and a single array of bi-concave lenses providing the negative power for the system. Furthermore, each array is made uniformly from the same optical material.

The design shown in FIGS. 6a and 6b and detailed in Tables 1 and 2 has a gap 65 between Lens 2 and Lens 3 that is only 0.143 mm. The design shown in FIGS. 7a and 7b and detailed in Tables 3 and 4 has a gap 75 between Lens 2 and Lens 3 that is only 0.05 mm These are significantly reduced from the gap incorporated into commercially available prior art using standard Galilean telescopes, like the Eschenbach MAX TV and MAX Event glasses. Standard Galilean approaches by necessity have an airgap in the range of 20 mm to 40 mm. A preferred embodiment of the current invention when used for visual optical systems with the eye as the receiver includes a gap which is greater than 2 microns and less than 10 mm. This enables an optimally compact design form. In fact, in a further preferred configuration, the gap (and commonly it will be an airgap) is less than the aperture of a single lenslet (diameter or transverse dimension).

A gap greater than 2 microns is desired in order to provide a refractive index break between the powered surface of Lens 2 and the powered surface of Lens 3. Without a refractive index break, Lenses 2 and 3 will have little or no power. A gap comprising air is a preferred configuration because it provides a large refractive index break, with air having a refractive index of 1.0 compared with 1.45 to 1.80 at visible wavelengths for most common optically transparent materials as used in Lenses 2 and 3.

For visual systems where the eye is the receiver, a gap less than 10 mm is desired in order to maintain a compact design and in order to provide the viewer with a reasonable field of view. The field of view of each individual afocal magnifier, as shown in FIGS. 6b and 7b, is limited by the aperture of the lenslets attached to substrate 2—namely Lenses 3 and 4. The ray traces show that off-axis light must pass through Lenses 3 and 4 of the same individual afocal magnifier. Off-axis light that crosses over into the adjacent individual afocal magnifier is considered to be stray light or noise known as cross-talk and is undesirable. So, for any given system, the longer the gap, the more opportunity off-axis light has to cross over into the adjacent individual afocal magnifier, and the more limited is the field of view. A gap greater than 10 mm is not desired, and in many situations may not be usable, because the system is no longer very compact, unwanted cross-talk becomes a significant concern, and field of view becomes limited.

The focus of the system can be adjusted by changing the gap between lenses—65 and 75 as shown in FIGS. 6a and 7a respectively. A mechanical adjustment mechanism can be introduced in order to change this spacing and adjust focus for each eye. In practice, this is an extremely difficult, precise and potentially costly adjustment to make, and therefore a preferred implementation of the present invention involves setting the spacing to a fixed distance and having no adjustment mechanism. Another advantage of the current invention which utilizes two gapped substrates, is that the gap between lenses is controlled by setting the gap 64 and 74 respectively in FIGS. 6a and 7a between substrate 1 and substrate 2. One method for achieving this is to insert a precision spacer into the gap between substrate 1 and substrate 2, wherein the spacer contacts each substrate and has a thickness such that the desired gap between lenses is achieved. For the system shown in FIG. 6a the spacer thickness is 0.459 mm, and for the system shown in FIG. 7a the spacer thickness is 0.100 mm. The spacer is made from any material that can be made thin enough and is stable over a range of operating temperatures. This includes but is not limited to glass, metal, plastic, polymer, ceramic, and fiberglass.

In a preferred embodiment of the current invention, the area of the substrates is greater than the area of the lens arrays, and the spacer is inserted at the perimeter of the substrates and outside the active optical area of the lens arrays. In this manner, the spacer does not block, occlude or vignette light passing through the optical magnifier. Furthermore, the substrates can be oversized to allow easy mounting to the eyeglass frames without blocking, occluding or vignetting light passing through the optical magnifier.

An alternative method for setting the gap between substrate 1 and substrate 2 is to use an adhesive filled with precision microspheres. The precision microspheres should have a diameter at or near the desired gap between the two substrates. The adhesive is applied at the perimeter of the substrates and outside the active optical area of the lens arrays, and is compressed until the gap reaches a minimum. The minimum occurs when the gap is equal to or nearly equal to the diameter of the precision micro spheres.

With a fixed distance between the arrays, in order to maximize the depth of field, it is preferred to set the focus of the system not at infinity in object space but rather at a closer distance such as 50 to 75 feet. By doing this, we ensure that the system maintains good focus between infinity and say 10-15 feet.

This large depth of field is enabled by the fact that the apertures of the lenslets are small and the focal length of each of the lenslets is very short. As a general rule, the shorter the focal length of a lens the greater the depth of field, and the smaller the aperture the greater the depth of field. As an example, the focal length of Lens 1 for the design shown in FIGS. 6a and 6b is 1.842 mm. The focal length of Lens 2 is −0.975 mm. The aperture diameter of each is 1.0 mm. Standard Galilean telescopes, as used in commercially available prior art systems such as fielded by Eschenbach have an aperture of at least 20-50 mm. This is a factor of more than ten times greater than the apertures employed in the embodiment of this invention shown in FIGS. 6a and 6b. Similarly, the focal lengths of lenses employed in commercially available prior art systems such as fielded by Eschenbach are greater than the focal lengths of lenses employed in the embodiment of this invention shown in FIGS. 6a and 6b by an order of magnitude or more. In a preferred embodiment of this invention, the array of lenses 52 attached to the first side of a first substrate 51 have a focal length less than 10 mm.

The aperture of the individual afocal magnifier design shown in FIG. 6b and detailed in Table 1 has a diameter of 1.0 mm. In order for the eye to be able to receive multiple images at the same time, and for the perceived view to be seamless if the eye moves behind the magnifier system, the maximum useful aperture no larger than 3 mm wide. Of course for systems involving a detector or receiver or limiting aperture that is bigger than the eye, apertures larger than this limit may be required. At the other extreme, the limits on manufacturing mean that apertures smaller than approximately 5 microns will be expensive and difficult to manufacture. In a preferred embodiment of this invention, the aperture of the individual afocal magnifiers and the lens arrays attached to the substrates have a width greater than 5 microns and less than 3 mm. In practice, the aperture and pitch of the lens arrays will most likely be driven by the available thickness of substrate and the mechanical and manufacturing constraints. Typical inexpensive wafers of materials such as float glass and fused silica can be purchased in the range between 0.5 mm and 1.1 mm thick, and the most likely aperture/pitch for the lens arrays will therefore be in the range between 0.25 mm to 1.0 mm.

One of the practical tradeoffs of this design is that while advantages in weight, head torque, field of view, and eyebox are present when compared with a standard Galilean telescope, the design yields reduced brightness. This is due to the fact that the present invention does not have the same pupil magnification in object space as a standard Galilean telescope. This optical system has an effective pupil in object space or entrance pupil which is identical to the limiting diameter of the eye pupil. A standard Galilean telescope has an entrance pupil whose size is M× (eye pupil diameter), where M is the magnification of the telescope. So, to first order, the present invention will suffer a loss of brightness when compared with a standard Galilean telescope of $1/M^2$. For example, if the telescope magnification M=3, then the present invention will have ⅑ the brightness of a standard Galilean telescope to first order. Some of this loss will be mitigated by the pupil of the eye expanding in low light conditions, but it will tend to limit the practical application of this invention to magnifications less than approximately 5× without external illumination or other gain in the system.

If external illumination or other system gain is provided then much higher magnifications are viable. External illumination provides extra scene brightness making higher magnification systems viable. In order to provide comparable brightness at the imaging sensor as would be expected with a standard Galilean telescope magnifier, external illumination will need to be provided that boosts the brightness by $M^2$ for an optical magnifier according to the present invention with magnification M. Alternatively, the system gain can be boosted by other means such as electronic gain found in camera systems and night vision goggles. For example, if the optical magnifier were used in conjunction with a camera lens and typical CMOS or CCD detector, then higher gains are possible because of the auto-gain characteristics provided by the detector. Despite the fact that with higher magnifications of 10, or even say 100, the present invention will suffer a significant loss of brightness when compared with a standard Galilean telescope attachment, this can be compensated by the camera detector or sensor increasing the system brightness.

Each individual focal magnifier in the array also needs to have the same magnification. When using the magnifier system, the eye intercepts light or radiation from multiple individual afocal magnifiers at any given time. If each afocal magnifier is identical, then the eye and brain will seamlessly fuse these multiple identical viewed scenes together to make a seamless image. If, however, the individual afocal magnifiers have differing magnification, the eye/brain will overlay these different scenes and the scenes will appear blurred. So, a difference in magnification between individual afocal magnifiers appears as image blur. In the limit, the magnification of the individual afocal magnifiers should not vary across the array by more than a total of 1% or the system will be unusable. In a preferred embodiment of the current invention, the magnification of individual afocal magnifiers varies by less than 1% across the whole array. For reasonable quality imaging, it is recommended that the magnification be held to better than 0.1% across the array. In a preferred embodiment of the current invention, the magnification of individual afocal magnifiers varies by less than 0.1% across the whole array.

This optical system can be manufactured in a number of ways. Replication is one cost effective way of making the arrays. Often this utilizes wafer based production. For example, in this embodiment the first substrate is a glass wafer. The lenses are then formed on each side of the wafer in turn by applying a liquid polymer material to the substrate surface, applying a custom tool which is shaped such that the lens array is formed in the polymer against the wafer, and then curing the polymer with the application of UV light. The UV light cures and solidifies the polymer in place, ensuring the lens array is permanently applied to the side of the substrate. The process is then repeated for the second side as needed. And the second substrate is treated in like manner to form the arrays of lenses on each side of substrate 2. The designs shown and detailed herein use well known optical polymers such as acrylic, PMMA, polystyrene, polycarbonate and Norland 61. It should be noted though that most manufacturers of replicated optics, have a variety of proprietary optical polymers with different indices of refraction and abbe number.

Another manufacturing method involves laying down a layer of optical transparent medium on the substrate that can be etched off the surface, like polymer such as PMMA or many others. In this method, using lithography techniques, the medium (commonly called resist in lithography) is judiciously etched away in places to create the array surface in the medium. After the etching is completed on one side, the lens array is completed, and the process can be repeated for the other side of the substrate.

A further manufacturing method is to stamp or emboss each desired array into a polymer sheet, and then laminate the sheets to substrate 1 and 2 to give the desired configuration.

Another preferred embodiment of this invention requires the two substrates to have similar thermal properties, and in particular similar thermal expansion. If one considers using the optical magnifier in different thermal environments, thermal expansion can be a serious problem. By way of example, when watching a football game in Phoenix Arizona the optical system may operate in an environment where the temperature could be as high as 45° C. On the other hand, watching a game in Green Bay Wisconsin the optical system may operate in an environment where the temperature could be as low as −35° C. Therefore, the system should be able to perform over a rather wide temperature range of as much as 80° C. or perhaps greater. The problem with the prior art using two arrays is that if they are made from the same material, then the system performance in the visible will be very poor suffering from large amounts of chromatic aberration and may be unusable in many applications, or if they are made from different materials in order to correct chromatic aberrations, then the different coefficients of thermal expansion of the materials will cause the arrays to expand and contract at different rates when the temperature changes, thus altering the pitch of one array relative to the other and causing unacceptable image blur.

There are solutions to this issue of thermal expansion. One solution is to select the same material for both substrate 1 (51) and substrate 2 (56). The result of this will be that substrate 1 and substrate 2 expand and contract at the same rate when the system experiences temperature change. Consequently, the arrays of lenses on substrate 1 and the arrays of lenses on substrate 2 will continue to have the same pitch, albeit a pitch that changes at different temperatures; and the optical axes 55 between the arrays of lenses on substrate 1 and the arrays of lenses on substrate 2 will maintain parallelism across the full extent of the substrate. Chromatic aberration is still able to be corrected due to the freedom to choose different optical materials for the powered surfaces in the arrays, namely Lenses 1 through 4 in FIGS. 6*a* and 7*a*. In a preferred embodiment of this invention, a first substrate 51 and a second substrate 56 are made from the same material.

A second and perhaps more general solution is to choose different materials for substrate 1 (51) and substrate 2 (56), but constrain them to have similar coefficients of thermal expansion. In order to place limits on what is acceptable, let us consider the following calculations. The change in linear dimension of a system Δd caused by a change in temperature ΔT is calculated as follows $$\Delta d = CTE \times d \times \Delta T$$

Where Δd is the change in linear dimension (mm)
CTE is the coefficient of thermal expansion of the material (mm/mm/° C.)
d is the linear dimension (mm)
ΔT is the change in temperature (in degrees Centigrade ° C.).

Therefore, two different materials with the same linear dimension d, will experience changes in linear dimension when the temperature changes by ΔT as follows $$\Delta d_1 = CTE \times d \times \Delta T$$

$$\Delta d_2 = CTE \times d \times \Delta T$$

So, substrate 1 and substrate 2 experience a relative change in linear dimension of $$\Delta d_1 - \Delta d_2 = (CTE_1 - CTE_2) \times d \times \Delta T$$

when the temperature changes by ΔT.

Shifting Lens 3 and 4 (57 and 58) in a transverse direction (i.e. perpendicular to the optical axis) relative to Lens 1 and 2 (52 and 53), as occurs when substrate 1 and substrate 2 have different coefficients of thermal expansion, causes the optical axis of the individual afocal imager to change direction or tilt. It also introduces off-axis aberrations such as coma and astigmatism.

The limit of resolution of the human eye is approximately 1 minute of arc. Typically, therefore, in order to maintain good imaging in a visual system, we should not introduce more than say 2 minutes of aberration or blur (approx 0.0006 radians) if we want to maintain good imaging. A transverse shift of Lens 3 and 4 causing an axis tilt will be perceived as image blur.

Analysis of the optical design shown in FIGS. 7a and 7b and detailed in Tables 3 and 4, reveals that a shift of 0.5 microns causes image blur of 2 minutes of arc. A typical array to be used with the human eye has d=20 mm in maximum transverse extent in order to deliver an acceptable field of view to the eye. A well designed system will need to able to handle ΔT=80° C. as described above. The max allowable change in CTE between the substrates in this case is $$CTE_1 - CTE_2 = \frac{\Delta d_1 - \Delta d_2}{d \times \Delta T}$$

$$= \frac{0.0006}{20 \times 80}$$

$$= 0.031 \times 10^{-5} \text{ mm/mm/}° \text{ C.}$$

The following table shows the CTE for a number of commonly used optical materials.

TABLE 5

| Material | mm/mm/° C. × 10⁻⁵ |
| --- | --- |
| Polycarbonate | 6.5 |
| Polystyrene | 8 |
| Acrylic | 6.8 |

TABLE 5-continued

| Material | mm/mm/° C. × 10⁻⁵ |
| --- | --- |
| BF33 Float Glass | 0.325 |
| D263T Float Glasss | 0.72 |
| Fused Silica | 0.055 |

Review of Table 5 reveals that none of the materials shown has a CTE within 0.031×10⁻⁵ of another material. So, for the conditions described above, good imaging cannot be achieved if two different substrate materials are chosen for substrate 1 and substrate 2 from this typical group of materials.

Analysis of the optical design shown in FIGS. 6a and 6b and detailed in Tables 1 and 2, reveals that a shift of 6.0 microns causes image blur of 2 minutes of arc. Using the same typical values of d=20 mm and ΔT=80° C., the max allowable change in CTE between the substrates in this case is $$CTE_1 - CTE_2 = \frac{\Delta d_1 - \Delta d_2}{d \times \Delta T}$$

$$= \frac{0.006}{20 \times 80}$$

$$= 0.375 \times 10^{-5} \text{mm/mm/}° \text{ C.}$$

This design is more tolerant of changes in CTE. Review of Table 5 reveals that a number of substrate combinations are possible, as there are materials in the table that have CTE within 0.375×10⁻⁵ of another material. For example, good imaging is achieved under these conditions if substrate 1 is made from fused silica and substrate 2 is made from BF33 float glass. Another possible combination is polycarbonate and acrylic.

In the limit, it is desired to keep the image blur caused by a change in temperature to less than 10 minutes of arc. Image blur greater than this will be unacceptable. Analysis of the optical design shown in FIGS. 6a and 6b and detailed in Tables 1 and 2, reveals that a shift of 30 microns causes image blur of 10 minutes of arc. Using the same typical values of d=20 mm and a reduced thermal range of ΔT=50° C., which may be acceptable in some circumstances, the max allowable change in CTE between the substrates in this case is $$CTE_1 - CTE_2 = \frac{\Delta d_2 - \Delta d_2}{d \times \Delta T}$$

$$= \frac{0.03}{20 \times 50}$$

$$= 3.0 \times 10^{-5} \text{ mm/mm/}° \text{ C.}$$

In a preferred embodiment of the current invention, a first substrate 51 and a second substrate 56 are made from different optically transparent materials, wherein the coefficients of thermal expansion of said different materials differ by no more than 3×10⁻⁵ mm/mm/° C.

The design form shown in FIGS. 5, 6a and 6b and detailed in tables 1 and 2 is much more tolerant of shift or decenter of Lens 3 and 4 relative to Lenses 1 and 2. This kind of shift can be introduced by mechanical decentering (misalignment of the wafers) during manufacture, as well as by changes in temperature. The difference between the design forms shown in FIG. 6 and FIG. 7 is that the focal lengths of each group of lenses is much greater in magnitude in the design form of FIG. 6 than in FIG. 7. Table 6 shows the focal length of the compound element consisting of Lens 1/Substrate1/Lens 2, and the focal length of the compound element consisting of Lens 3/Substrate2/Lens 4, for both design form shown in FIGS. 6 and 7.

TABLE 6

|  | Lens1/Substrate 1/ Lens 2 combination | Lens3/Substrate 2/ Lens 4 combination |
|---|---|---|
| FIG. 6 Design Form | 341.5 mm | −113.7 mm |
| FIG. 7 Design Form | 2.020 mm | −0.670 mm |

The decreased sensitivity to misalignment for the design form illustrated in FIG. 6 stems from the increased magnitude in focal lengths in this design form. This decreased alignment sensitivity is highly desirable from a manufacturing standpoint. Therefore, in a preferred embodiment of the current invention, the optical power of the combined group consisting of Lens 3, substrate 2 and Lens 4 is negative, and the magnitude of the focal length is greater than 5 mm. We specifically include the limiting case where the focal length is infinite, implying the combined group consisting of Lens 3, substrate 2 and Lens 4 is an afocal magnifier.

Figure 8:
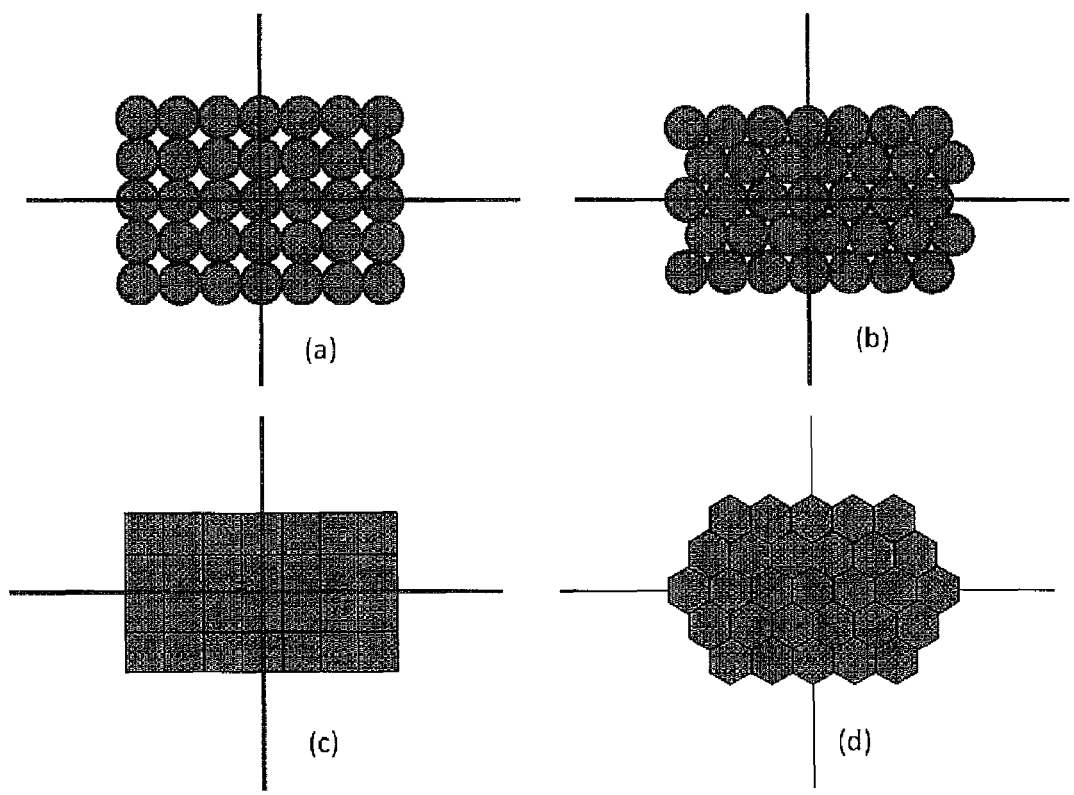

FIG. 8 shows a number of different options for the aperture of the lenslets making up the system. Many common optical systems have circular apertures, but as we can see in FIG. 8(a), that this will not maximize the amount of light through the system. Improved system brightness can be achieved by utilizing contiguous rectangular apertures with a fill factor of 100% or almost 100% as shown in FIG. 8(c), or hexagonal apertures as shown in FIG. 8(d) but these will probably increase tooling cost for manufacturing. In a preferred embodiment of this invention, a good blend of good system performance, improved system brightness and efficient packing is achieved by incorporating arrays of lenses with circular apertures packed on a hexagonal grid as shown in FIG. 8(b).

As discussed previously, cross-talk is a mechanism for undesirable stray light to reach the eye or detector. Cross-talk occurs when high angle light emerging from Lens 2 strikes Lens 3 of an adjacent individual afocal magnifier unit, rather than Lens 3 of the same individual afocal magnifier. In order to mitigate cross-talk, a plurality of masks are employed. Each mask is in general a transverse obscuration or series of obscurations placed to limit the field of view and limit light from "walking off" into an adjacent afocal magnifier. An advantage of this invention, which includes two substrates, is that masks can be applied directly to the surfaces of the substrates. Typical methods of applying the masks include vacuum coating of opaque materials such as black chrome, and screen printing using opaque materials such as black ink, but other options are also possible as will be understood by those skilled in the art. In a preferred embodiment of the current invention, masks are applied directly to one or more surfaces of the substrates, and are designed and positioned to block or partially block light from crossing from one individual afocal magnifier into an adjacent individual afocal magnifier.

The optical magnifier described herein is used by holding it close to the eye or the receiver, and simultaneously receiving the input from multiple individual afocal magnifiers. In order to provide comfortable viewing at events, a further preferred embodiment of this invention comprises two afocal magnifiers 92 and 93 (one for each eye) as described previously and shown in FIGS. 5, 6, and 7, and an eyeglass frame 94 adapted for viewing by a human, wherein each afocal magnifier is held by said eyeglass frame. This configuration is shown is FIG. 9. Also shown in FIG. 9 is the preferred configuration where the area of the substrates is greater than the active area of the lens arrays allowing for easier mounting to the eyeglass frames.

In systems viewed with the eye, there is potential in certain circumstances for the substrates to shatter and cause damage to the eye, depending on the materials chosen for the substrates. In order to protect the eye, a further embodiment of this invention incorporates a protective "cover glass" 102 with each optical magnifier 103, wherein the cover glass is positioned between the optical magnifier and the eye. This configuration is shown in FIG. 10. The cover glass is made from an optically transparent medium, and has high impact resistance and/or shatter resistance. Materials that meet these requirements include polycarbonate, acrylic, chemically strengthened glass, and others known to those skilled in the art.

The afocal magnifier described hereto and shown in FIG. 5 can be used to provide a magnified view of objects at distances between infinity and approximately 3 meters. It relies on having a large object distance so that light intercepted by the magnifier is collimated or largely collimated. In order to provide a magnified view of objects close to the observer, additional optics are needed in order to provide a collimated or largely collimated input to the magnifier. The current invention is therefore fashioned for close-up magnification with the addition of a collimating lens 112 as shown in FIG. 11a. The collimating lens 112 is placed adjacent to the afocal magnifier array, and between the object 111 to be observed and the afocal magnifier array 113 as shown in FIG. 11a. This collimating lens has positive power and has a relatively short focal length. The collimating lens is ideally positioned such that its optical axis passes through or near the center of the observer's eye. The object being observed is placed at or near the front focal plane of the collimating lens. The focal length of the collimating lens will be in a range between 25 mm and 300 mm depending on the desired overall system magnification. The shorter the focal length of the collimating lens, the higher the system magnification. FIG. 11a shows the collimating lens 112 having a plano-convex form but alternative forms include bi-convex and meniscus. The key is that regardless of the form of the collimating lens, the optical power is positive. A further preferred configuration has a collimating lens wherein one or more of the surfaces incorporates a diffractive optical surface in order to improve correction of chromatic aberrations. A further alternative is the positive power collimating lens comprises a Fresnel lens 115, as shown in FIG. 11b. A further alternative is the positive power collimating lens comprises a color corrected doublet. This doublet comprises two different materials chosen such that the design corrects for chromatic aberration, as is known by those skilled in the art. The collimating lens is made from an optically transmissive material or a plurality of optically transmissive materials such as glass, polymer, plastic or other materials known to those skilled in the art.

For binocular viewing of an object, two such close-up magnifiers as shown in FIG. 11a or 11b are utilized—one for each eye, with an eyeglass frame fashioned to mount the magnifiers comfortably in front of each eye. In this configuration, in order to view an object with both eyes simultaneously, the eyes will have to rotate to provide convergence. This can potentially cause eye strain if extended viewing is required. In order to allow the eyes to remain in a relaxed position, and yet still view an object with both eyes simultaneously, the "convergence" can be provided optically by using a single collimator for both eyes, or sections of a single collimator, as shown in FIGS. 12a and 12b. FIG. 12a illustrates an optical magnifier for binocular use with objects close to the observer. The optical magnifier includes a single collimating lens 122 used in conjunction with two afocal magnifiers 123 and 124, wherein the two afocal magnifiers are positioned to deliver a magnified image to both eyes of the observer 125 and 126. The object to be observed 121 is placed at the front focal plane of the collimating lens. The collimating lens is ideally positioned such that its optical axis passes through or near the midpoint between the observer's eyes. FIG. 12b illustrates an optical magnifier for binocular use with objects close to the observer similar to that shown in FIG. 12a, but in this implementation instead of using the entire collimating lens, only the two sections of the collimating lens immediately in front of each eye are used—diminishing the size and weight of the system and simplifying the mounting of the collimating lens. The system comprises two off-axis sections of a single collimating lens (127 and 128) and 2 afocal magnifiers (123 and 124) as shown in FIG. 12b. For a visual system, these components are further combined with an eyeglass frame fashioned to position the components comfortably in front of each eye.

An alternative design for binocular use with objects close to the observer utilizes a Fresnel lens for the collimating lens as shown in FIG. 13a. The optical magnifier includes a single collimating Fresnel lens 132 used in conjunction with two afocal magnifiers 133 and 134, wherein the two afocal magnifiers are positioned to deliver a magnified image to both eyes of the observer 135 and 136. The object to be observed 131 is placed at the front focal plane of the collimating lens. The collimating Fresnel lens is ideally positioned such that its optical axis passes through or near the midpoint between the observer's eyes. Another alternative design comprises two off-axis sections of a single collimating Fresnel lens (137 and 138), and two afocal magnifiers (133 and 134) as shown in FIG. 13b. For a visual system, these components are further combined with an eyeglass frame fashioned to position the components comfortably in front of each eye.

The array of afocal magnifiers described heretofore, may include 10-20 afocal magnifying lenses or as many as 100 or more.

Numerous other embodiments may be envisaged without departing from the spirit and scope of the invention.

The invention claimed is:

1. An optical magnifier comprising:
   a first light transmissive substrate having an array of lenses $A_1$ on a first side thereof and an array of lenses $A_2$ on a second side thereof, wherein the lenses have optical power and wherein the array $A_1$ is optically aligned with the array of lenses $A_2$ such that two opposing lenses on opposing sides of the first substrate have a common optical axis; and,
   a second light transmissive substrate having an array of lenses $A_3$ on a first side thereof and a array of lenses $A_4$ on a second side thereof, wherein the lenses have optical power and wherein the array $A_3$ is optically aligned with the array of lenses $A_4$ such that two opposing lenses on opposing sides of the second substrate have a common optical axis;
   wherein the first substrate and second substrate are supported in a spaced apart position, and wherein the first and second optical substrates are optically aligned so that together they form an array of afocal optical magnifiers, wherein at least one array associated with the first light transmissive substrate or the second light transmissive substrate has positive lenses and at least one other array associated with the first light transmissive substrate or the second light transmissive substrate has negative lenses.

2. An optical magnifier as recited in claim 1, wherein the magnification of each afocal optical magnifier within the array is identical to within 1%.

3. An optical magnifier as recited in claim 2, wherein each lenslet in said array of lenses $A_1$ on said first side of a first light transmissive substrate is plano convex; and wherein each lenslet in said array of lenses $A_4$ on said second side of a second light transmissive substrate is plano concave.

4. An optical magnifier as recited in claim 3, wherein each lenslet in said array of lenses $A_1$ is made from an optically transparent material with low optical dispersion and an abbe number V greater than 50.

5. An optical magnifier as recited in claim 3, wherein there is a gap between said array of lenses $A_2$ and said array of lenses $A_3$ ; and wherein the gap is filled with an optically transparent medium.

6. An optical magnifier as recited in claim 5, wherein said gap is less than the aperture of a single lenslet in the array or the array pitch.

7. An optical magnifier as recited in claim 5, wherein said first light transmissive substrate and said second light transmissive substrate are made from the same material.

8. An optical magnifier as recited in claim 5, wherein said first light transmissive substrate and said second light transmissive substrate are made from materials with similar thermal properties; and said materials shall have coefficients of thermal expansion that differ by no more than $3.0 \times 10^{-5}$ mm/mm/° C.

9. An optical magnifier as recited in claim 1 further comprising a collimating lens, said collimating lens being positioned between the object to be observed and the optical arrays, and wherein the object to be viewed is at or near the front focal plane of the collimating lens.

10. An optical magnifier as recited in claim 9, wherein said collimating lens comprises a singlet lens with positive optical power.

11. An optical magnifier as recited in claim 9, wherein said collimating lens comprises a Fresnel lens.

12. An optical magnifier as recited in claim 9, wherein said collimating lens comprises a diffractive lens.

13. A combination comprising two optical magnifiers as recited in claim 1 and an eyeglass frame, wherein both optical magnifiers are held by said eyeglass frame, and the optical magnifiers are positioned comfortably in front of the eyes.

14. A combination comprising a collimating lens, two optical magnifiers as recited in claim 1, and an eyeglass frame; wherein collimating lens is positioned between the object to be observed and the optical arrays and such that its optical axis passes through or near the midpoint between the observer's eyes.

15. An optical magnifier as recited in claim 14, wherein only the sections of the collimating lens in front of each eye are used rather than the whole collimating lens.

* * * * *